July 25, 1944.    J. W. GREER    2,354,516
MARSHMALLOW BEATER
Filed Jan. 30, 1941    3 Sheets-Sheet 1
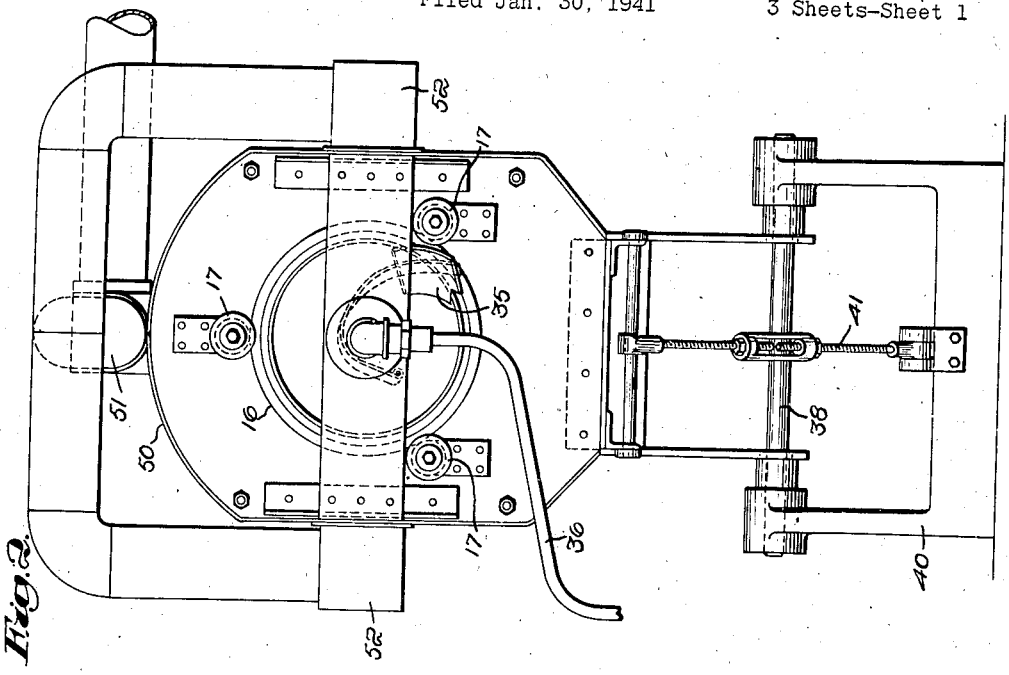
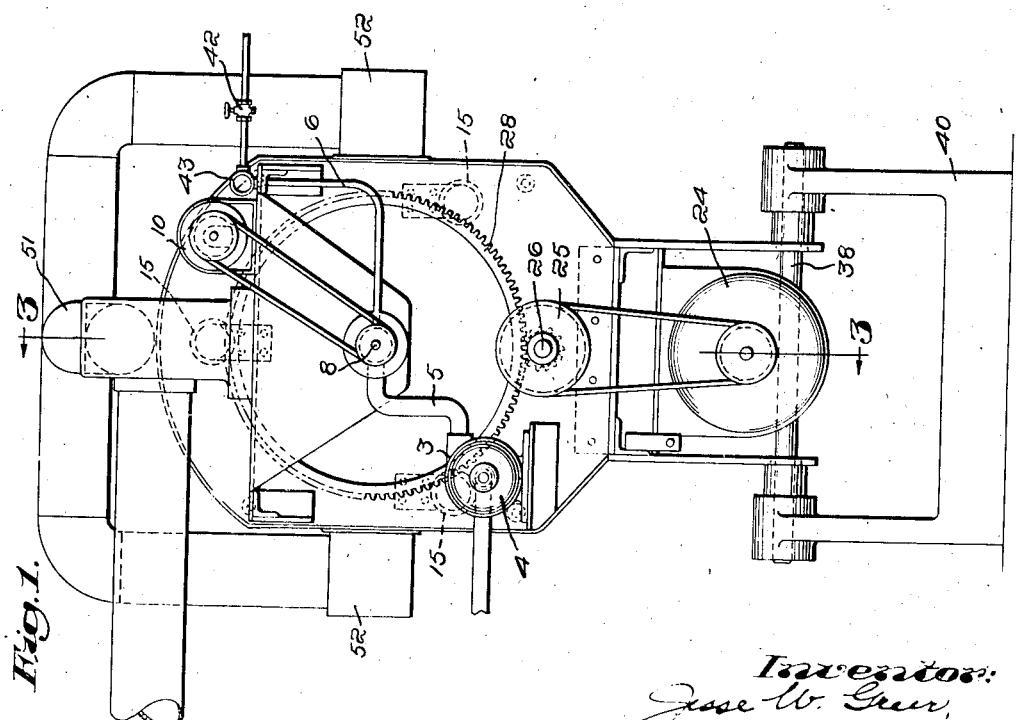

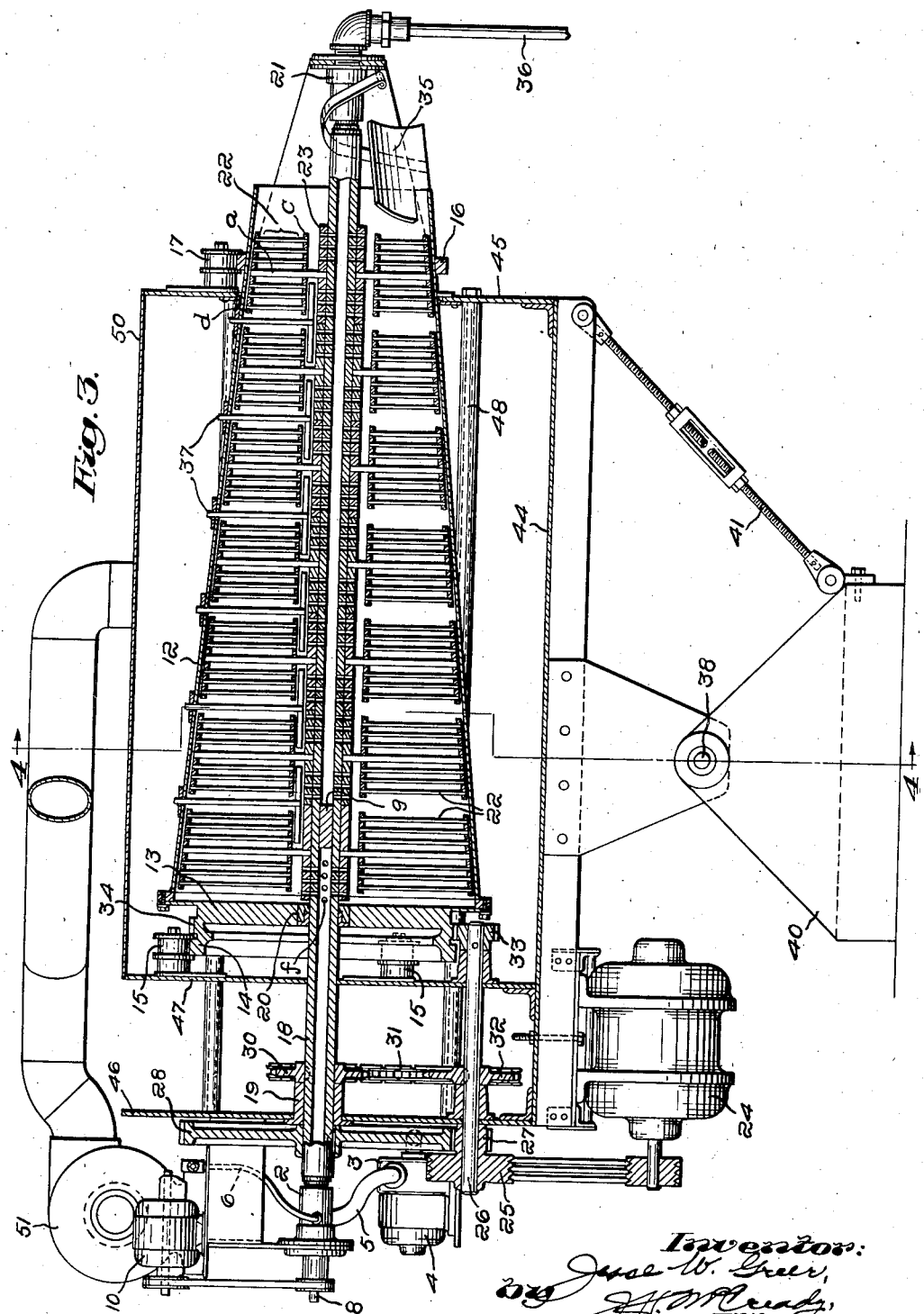

July 25, 1944.  J. W. GREER  2,354,516
MARSHMALLOW BEATER
Filed Jan. 30, 1941  3 Sheets-Sheet 3
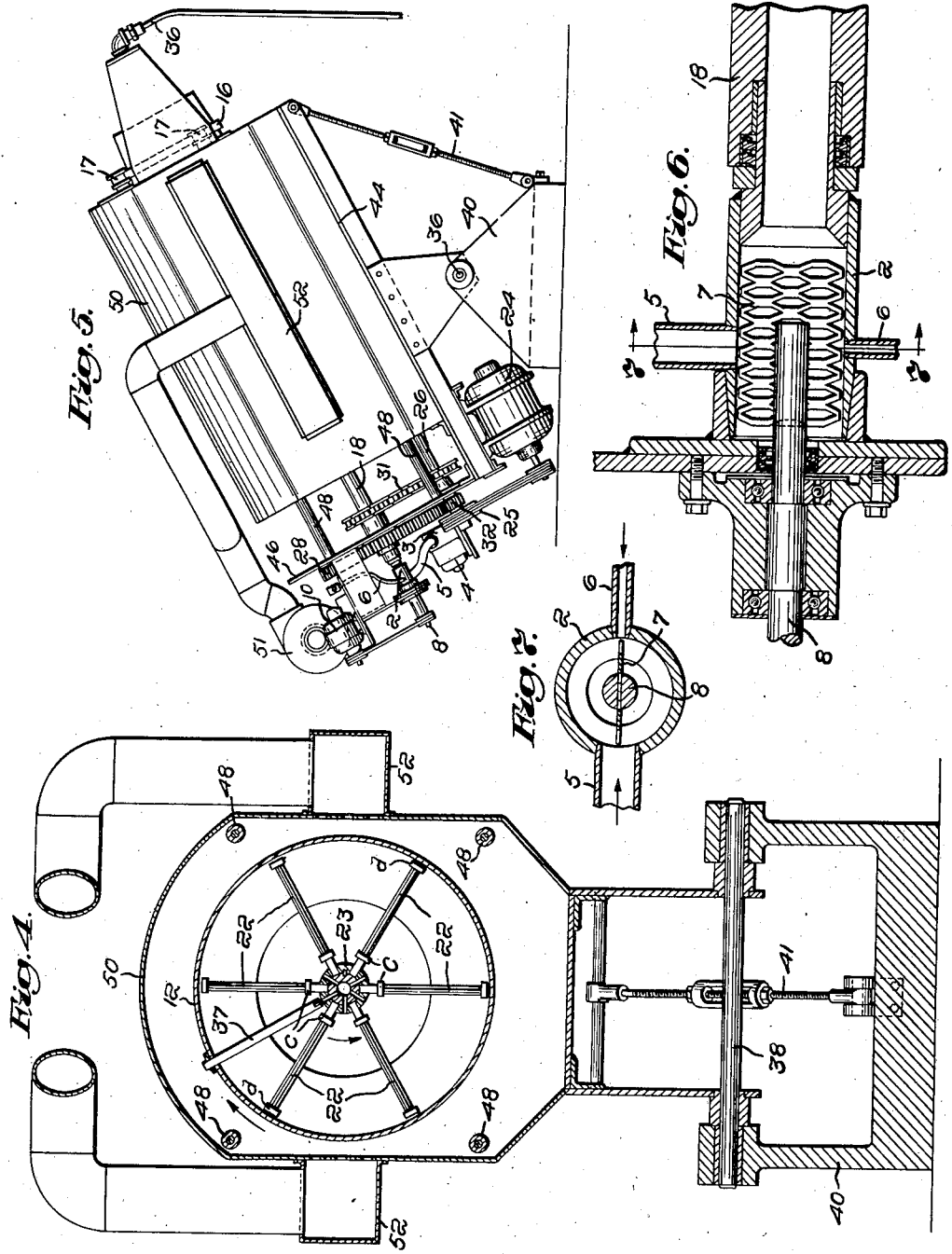

Patented July 25, 1944

2,354,516

UNITED STATES PATENT OFFICE 2,354,516

MARSHMALLOW BEATER

Jesse W. Greer, Cambridge, Mass., assignor to J. W. Greer Company, Cambridge, Mass., a corporation of Massachusetts Application January 30, 1941, Serial No. 376,572

11 Claims. (Cl. 261—93)

This invention relates to the manufacture of marshmallow fluff.

The commercial production of this material, so far as I have been able to learn, has always been by a batch method. That is, a suitable quantity of marshmallow syrup is introduced into a beater and is whipped until it assumes the desired consistency. The product so made is then discharged, and these operations are repeated. The present invention aims to improve both the methods of manufacture of this material, and also the machines for producing it, with a view to eliminating much of the labor involved in these prior art batch processes. To this end it is an object of the invention to devise a continuous process which will greatly simplify the procedure heretofore followed universally in this art. It is also an object of the invention to devise a machine which will perform this continuous process efficiently and will be adjustable to suit the requirements of different mixes and different operating conditions.

The nature of the invention will be readily understood from the following description when read in connection with the accompanying drawings, and the novel features will be particularly pointed out in the appended claims.

In the drawings,

Figure 1 is a front elevation of a machine constructed in accordance with this invention;

Fig. 2 is a rear elevation of the machine shown in Fig. 1;

Fig. 3 is a vertical, sectional view approximately on the line 3—3, Fig. 1;

Fig. 4 is a transverse, sectional view substantially on the line 4—4, Fig. 3;

Fig. 5 is a side view of the machine showing it in a normal operating position;

Fig. 6 is a longitudinal, sectional view through the pre-beater unit of the machine; and Fig. 7 is a sectional view on the line 7—7, Fig. 6.

Preparatory to a detailed explanation of the machine shown in the drawings, it may be pointed out that this invention provides a method of producing marshmallow fluff in which, according to the preferred procedure, the marshmallow syrup is whipped at a high speed into a creamy consistency, air being forced into the mix during this operation, and the material so prepared is then transferred to a second whipping step in which the beating or whipping operation is continued at a slower rate until the product has been worked into the desired condition or consistency. If desired, air under pressure may also be forced into the mix during the second stage of the whipping operation. As the whipping operation progresses, the material is fed toward the discharge end of the whipping zone, and the beating speed is gradually reduced as the material reaches the point of discharge.

Referring first to Figs. 1, 2, 3 and 6, the machine there shown comprises a stationary tubular housing or casing 2 provided with a chamber in which the initial or primary whipping operation takes place. The marshmallow syrup is delivered to this chamber by means of a pump 3 driven by a vairable speed motor 4, Fig. 3, the pump drawing the syrup from any convenient source of supply and discharging it through a pipe 5 into the chamber. Simultaneously with such delivery, compressed air is discharged through the pipe 6 into the chamber, and the air is rapidly beaten into the syrup by means of a revolving beater, whip or dash 7, Fig. 6. This element, as shown, consists of a flat reticulated plate, with large slots punched out of it, and little metal being left separating them. This plate is secured firmly in a slot formed axially in the shaft 8. A motor 10 is belt-connected to this shaft, as shown in Figs. 1 and 3, and revolves the dash at a high speed, thus beating air into the syrup and rapidly working it into a creamy consistency ready to be delivered to the second step of the whipping process.

The mechanism provided by this invention for performing this second step comprises a casing 12, Fig. 3, of frusto-conical form and mounted for rotation around its own axis. For this purpose the base 13 of the casing has a circular portion 14 formed on it which is supported on three rolls 15, as best shown in Figs. 1 and 3. Near the opposite end of the casing a ring 16 encircles it and is secured rigidly thereto, and this ring also is supported on three rolls 17, as clearly shown in Figs. 1 and 2.

Extending axially through the casing 12 is a hollow shaft 18, mounted in three bearings indicated, respectively, at 19, 20 and 21, Fig. 3, and this shaft supports a rotary beater which is snugly enclosed in the casing 12 and revolves therein. In the particular construction shown this beater consists of a series of beater units or whips, all keyed, or otherwise secured, to the shaft 18 for rotation therewith. Referring, for example, to the upper right-hand beater unit or whip 22, Fig. 3, it will be observed that it includes a post or rod $a$, the lower end of which is fastened rigidly in a hub section or sleeve 23 splined to the shaft 18. Two bars $c$ and $d$, respectively, are secured rigidly to the post a near its inner and outer ends and several wires or small rods extending parallel to the post connect the bars at regularly spaced intervals. All of these parts a, c and d are welded securely together to form a beater unit or whip. Other units like that shown at 22 are secured to the hub 23 at points spaced by equal angular distances around the hub, any suitable number of these elements being used. In the construction shown six are mounted on each hub section, as indicated in Fig. 4, and a series of these hubs, each carrying its own set of whips, are mounted on the shaft 18, end to end, and are all keyed or splined thereto. It should be observed that the outer bar d of each unit is positioned closely adjacent to the inner surface of the tapered casing 12, and that each is inclined at such an angle that it has a small but uniform clearance with the casing throughout its entire length so that they act as scrapers as well as whips. Also, the dimensions of these whips are such that they extend both longitudinally and radially across substantially the entire free space within the casing.

The whips and the casing are revolved in opposite directions, and for this purpose a variable speed motor 24 is secured to the lower side of the machine frame and is belt-connected to a pulley 25, Fig. 3, supported loosely on the shaft 26 so that it revolves therearound. A pinion 27 integral with, or rigidly secured to, the pulley 25 drives a gear 28 which is keyed to the beater shaft 18. Also secured fast on this shaft is a sprocket wheel 30 driving a chain 31 which, in turn, drives the sprocket wheel 32 fast on said shaft 26. A pinion 33 keyed to this shaft drives a gear 34 which is integral with, or is otherwise secured rigidly to, the base 13 of the casing 12. It will be obvious that such an arrangement drives the casing 12 in the opposite direction from that in which the shaft 18 revolves.

The marshmallow mix beaten in the casing 2, as above described, is forced continuously into the adjoining hollow section of the shaft 18 by the pressure of the incoming syrup and the compressed air which is simultaneously delivered into the casing with it. As clearly shown in Fig. 6, the mixer chamber in the primary unit 2 is in direct communication with the open ended bore formed in the left-hand end portion, Fig. 3, of the shaft 18 which supports the whips for the secondary unit, the connection between these parts including a stuffing box or packing arrangement for preventing any substantial leakage of the mixture as it travels from the primary mixing chamber along the bore of the shaft into the chamber of the subsequent unit. The mix flows along the shaft 18 and is discharged into the casing 12 through a series of holes f, Fig. 3, drilled radially through the wall of the shaft, these holes registering with similar holes in the hub of the first beater element 22.

When the machine is in operation the partially aerated mix delivered in the manner just described to the larger end of the casing 12 is rapidly whipped by the beater, and as this operation progresses and more mix is forced into the casing, the beaten material is forced by the pressure of the incoming mixture through the casing toward the open right-hand end thereof, as shown in Fig. 3. It has been found advantageous to reduce the whipping rate gradually as the process approaches completion, and this fact is one important reason for making the casing 12 in a tapered or conical form, since this construction automatically reduces the whipping rate on the mixture due to the progressively reduced radius and the correspondingly lower peripheral speed of the whips as the beaten mass approaches the open discharge end of the casing.

At this point the beaten material comes in contact with a stationary inclined scraper 35 which automatically scrapes it off the inner wall of the casing into any convenient receptacle or carrier.

With some kinds of marshmallow mixes the whipping operation is aided by introducing air into the mix substantially throughout the entire whipping operation. For this purpose an air supply pipe 36 is connected with the outer end of the hollow shaft 18 where air so delivered will be distributed throughout the greater part of the length of the casing, the air flowing radially through the registering holes in the shaft and the hubs 23. A plug g, Fig. 3, separates this section of the bore of the shaft from the mixture conducting section between the plug and the premixing chamber 2.

During operation the inner surfaces of the casing 12 are kept sufficiently clean for practical purposes by the whips themselves, but there is a tendency for the material to load up on the shaft 18. Accordingly, several scrapers 37 are secured to the revolving casing 12, each being of T-shape and having its relatively wide inner end positioned closely adjacent to the hubs 23. The shafts of the scrapers may conveniently be welded to the casing 12 and the lengths of the scraping surfaces of these elements are such as to keep most of the area of the shaft 18 reasonably free from accumulations of the beaten mixture.

It has been found unnecessary to use mechanical means for feeding the mix through the casing, the pressure of the incoming stock and of the beaten material being sufficient for this purpose. Under some conditions, however, there is a tendency for the stock to feed through too rapidly when the casing is in a horizontal position, as shown in Fig. 3, and provision therefore is made for adjusting the angular position of the casing to suit the requirements of different mixes and different operating conditions. For this reason the casing is pivoted at 38 on a base 40, and a turn-buckle 41, or any other convenient arrangement, may be provided to adjust the machine to the desired angle and also to hold it in its adjusted position. For the ordinary run of marshmallow fluff, the best results have been produced by running the machine at about an angle of 30°, as shown in Fig. 5.

This provision for adjustment, together with the tapered form of the housing, has the further advantage of maintaining the mix at the larger end of the casing so long as it is in a liquid form. It is subjected to a greater whipping action in this region, as above pointed out, and it is moved along toward the discharge end of the casing only as its condition is suitably modified by the beating action.

The operating factors controlling the rate of production, such as the speed of rotation of the beater and the casing, the rate at which the syrup is delivered to the machine, and the volume of compressed air discharged into the stock, are all under control and are all adjustable so that all or any of these factors may be varied to suit the requirements of individual mixes. The air intake pipe 6 is equipped with a control valve 42 and a pressure gage 43, Fig. 1, and the other air supply line 36 may be similarly equipped. In this connection it may be pointed out that no substantial degree of pressure is ordinarily required on the air delivered to either the high speed or low speed beater units. A somewhat higher pressure normally is required in the former than in the latter, but only enough pressure is necessary to ensure the discharge into the mix of the desired volume of air. A pressure of one pound per square inch usually is ample.

The frame supporting the various parts includes a structural steel base 44, Fig. 3, with upright end plates 45 and 46 and an intermediate plate 47 secured thereto. A series of stay rods 48, Figs. 3 and 4, extending the entire length of the frame and equipped with suitable spacing collars, cooperate with the base 44 in holding these plates 45, 46 and 47 in their operative positions and in properly spaced relationship.

Considerable heat is generated during the whipping operation, and for this reason I prefer to enclose the greater part of the casing 12 in a jacket 50 through which cool air may be circulated. A forced circulation preferably is provided by means of a motor driven blower 51, Fig. 3, the delivery pipe being divided and connected to two headers 52—52, Fig. 4, at opposite sides of the casing.

An important advantage of this invention is that the whipping operation is performed in two steps, as above described. This feature materially improves the efficiency of the machine because a given degree of aeration of the syrup as initially pumped into the machine can be produced more quickly in the high speed primary unit 2 than in the slower speed secondary unit 12. A higher rate of production thus is obtainable, and a smaller and more compact machine is permissible for a given volume of marshmallow per hour.

While I have herein shown and described a preferred embodiment of my invention, it will be evident that the invention may be embodied in other forms without departing from the spirit or scope thereof.

The method above disclosed is not claimed in this application but is claimed in my divisonal application Ser. No. 499,339, filed August 20, 1943.

Having thus described my invention, what I desire to claim as new is:

1. A marshmallow beater comprising an elongated casing of approximately circular cross-sectional form, a beater in said casing extending lengthwise thereof and comprising a shaft and a series of whipping elements projecting therefrom, mechanism for revolving said beater, means for feeding a marshmallow mix into said casing continuously, and means for continuously scraping the mix off the sections of said shaft between the whipping elements.

2. A marshmallow beater comprising a primary beater unit, a secondary beater unit, means for delivering marshmallow mix continuously to the primary unit, means for conducting air under pressure to the latter unit where it will be beaten into said mix therein, said secondary unit including a hollow shaft in coaxial relationship to, and communicating with, the beater chamber of the first unit, whereby the material beaten in the first unit is discharged directly into said shaft of the secondary unit.

3. A marshmallow beater comprising a primary unit including a casing having a mixing chamber therein, a revolving beater in said chamber, means for continuously feeding marshmallow mix into said chamber, means for forcing air into said mix while it is whipped by said beater, a secondary unit comprising an elongated casing of approximately circular cross-sectional form, a beater in the latter casing extending lengthwise thereof and comprising a hollow shaft arranged coaxially with the beater of the primary unit, and whip elements extending laterally from said shaft, said hollow shaft being in communication with the chamber of said primary unit, whereby the mixture beaten in the latter unit will be conducted directly into said shaft, and said shaft having openings for the delivery of said beaten mixture into the casing of the secondary unit, and mechanism for revolving said beaters at different speeds.

4. A marshmallow beater comprising an elongated casing of approximately circular cross-sectional form, a beater in said casing extending lengthwise thereof and comprising a shaft and a series of whipping elements projecting therefrom, mechanism for revolving said beater, means for feeding a marshmallow mix into said casing continuously, and scrapers carried by said casing and having scraping elements positioned for operation on the sections of said shaft between the whipping elements carried by the latter.

5. A marshmallow beater comprising an elongated casing of approximately circular cross-sectional form, a beater in said casing extending lengthwise thereof and comprising a shaft and a series of whipping elements projecting therefrom, mechanism for revolving said beater, means for feeding a marshmallow mix into said casing continuously, means for revolving said casing in a direction opposite to the direction of revolution of said beater, and parts carried by said casing for scraping off the mixture from the sections of said shaft between the whipping elements carried by the latter.

6. A marshmallow beater comprising an elongated casing of approximately circular cross-sectional form and tapered from one end thereof toward the other, a beater in said casing extending lengthwise thereof, mechanism for revolving said beater and said casing, means for feeding marshmallow mix into the larger end of said casing, means supporting said casing in an inclined position with its axis higher at the smaller end than at the opposite end, and a stationary scraper projecting into the smaller end of said casing where it serves to discharge the beaten material from the casing.

7. A marshmallow beater comprising an elongated casing of approximately circular cross-sectional form, a beater in said casing extending lengthwise thereof and comprising a shaft and a series of whipping elements projecting therefrom, mechanism for revolving said beater, said shaft having hollow portions near its opposite ends, means for feeding a marshmallow mix continuously into one end of said shaft, the latter end having one or more lateral apertures through which said mix is discharged into said casing, and means for feeding compressed air into said casing through the opposite end of said shaft, the shaft being apertured for the delivery of said air into the mixture being beaten.

8. A marshmallow beater comprising a main beating unit including an elongated casing of approximately circular cross-sectional form, a beater in said casing extending lengthwise thereof and comprising a shaft and a series of whipping elements projecting therefrom and mechanism for revolving said beater; means for feeding a marshmallow mix into said casing continuously including a primary beating unit, independent of said main unit, serving to whip said mix to a creamy consistency while it is on its way into said casing, and means for feeding compressed air continuously into the mixture being whipped in said primary unit.

9. A marshmallow beater comprising a primary unit including a casing having a mixing chamber therein, a revolving beater in said chamber, means for continuously feeding marshmallow mix into said chamber, means for revolving said beater at a high speed to whip said mix, means for forcing air into said mix while it is whipped by said beater, a secondary beater unit independent of said primary unit but in direct communication with said primary unit and into which the mix is forced from the latter unit substantially continuously, and mechanism for revolving the beater of said secondary unit.

10. A marshmallow beater comprising a primary unit including a stationary casing having a mixing chamber therein, a revolving beater in said chamber, means for continuously feeding marshmallow mix into said chamber, means for revolving said beater at a high speed to whip said mix, and means for forcing air into said mix while it is whipped by said beater; and a secondary unit comprising a rotary casing of approximately circular cross-sectional form and tapered from one end thereof toward the other, a beater in said casing extending lengthwise thereof, means for conducting the marshmallow mix beaten in said primary unit into the larger end of said rotary casing, and mechanism for revolving the beater of said secondary unit and the casing therefor in opposite directions.

11. A marshmallow beater comprising a primary unit including a stationary casing having a mixing chamber therein, a revolving beater in said chamber, means for continuously feeding marshmallow mix into said chamber, and means for forcing air into said mix while it is whipped by said beater; a secondary unit comprising an elongated rotary casing of approximately circular cross-sectional form and a beater in the latter casing extending lengthwise thereof, means for conducting the mixture beaten in said mixing chamber into the casing of said secondary unit, and means for revolving the beaters of the two units at different speeds.

JESSE W. GREER.